United States Patent [19]

Nishiguchi

[11] Patent Number: 4,809,536
[45] Date of Patent: Mar. 7, 1989

[54] METHOD OF ADJUSTING BRIDGE CIRCUIT OF SEMICONDUCTOR PRESSURE SENSOR

[75] Inventor: Masanori Nishiguchi, Kanagawa, Japan

[73] Assignee: Sumitomo Electric Industries, Ltd., Osaka, Japan

[21] Appl. No.: 110,662

[22] Filed: Oct. 20, 1987

[30] Foreign Application Priority Data

Nov. 6, 1986 [JP] Japan ............... 61-264747
Nov. 6, 1986 [JP] Japan ............... 61-264748

[51] Int. Cl.$^4$ ............................................. G01L 27/00
[52] U.S. Cl. ........................................ 73/4 R; 73/727; 338/4
[58] Field of Search ............... 73/4 R, 1 B, 726, 727, 73/720, 721, 862.65, 862.67, 4 V; 338/2, 4, 42

[56] References Cited

U.S. PATENT DOCUMENTS

| | | | |
|---|---|---|---|
| 3,899,766 | 8/1975 | Mermelstein | 73/726 X |
| 4,173,148 | 11/1979 | Yamada et al. | 73/766 |
| 4,174,639 | 11/1979 | Raven | 73/766 |
| 4,411,158 | 10/1983 | Schaff, Jr. | 73/727 X |
| 4,565,097 | 1/1986 | Dineff | 73/708 X |
| 4,611,129 | 9/1986 | Ishihors | 307/491 X |

Primary Examiner—Tom Noland
Attorney, Agent, or Firm—Cushman, Darby & Cushman

[57] ABSTRACT

A method of adjusting a bridge circuit of a semiconductor pressure sensor comprises the steps of providing conductive lines connected to at least one of diffused resistors at predetermined intervals during the wiring process, the diffused resistors being provided to connect strain gauge resistors constituting the bridge circuit; adjusting the resistance value of at least the one of the diffused resistors; making vacuum suction to the back surface of a diaphragm of the semiconductor pressure sensor in the testing process to make a state wherein pressure is virtually applied to the diaphragm from the surface side thereof; measuring the pressure sensitivity of the semiconductor pressure sensor from the surface side of the diaphragm by making use of the bridge circuit; and adjusting the resistance value of at least the one of the diffused resistors based on the pressure sensitivity thus measured to adjust the balance of the bridge circuit.

3 Claims, 3 Drawing Sheets

METHOD OF ADJUSTING BRIDGE CIRCUIT OF SEMICONDUCTOR PRESSURE SENSOR

BACKGROUND OF THE INVENTION

This invention relates to a method of adjusting a bridge circuit of a semiconductor pressure sensor under the wafer process and more specifically to a method of adjusting a bridge circuit of a semiconductor pressure sensor typical of a semiconductor pressure sensor fitted to the tip of a catheter for medical use.

When a mechanical stress is applied to a semiconductor crystal of silicon or the like, its resistance changes greatly because of the piezoelectric resistance effect and the perception of this fact has led to the development of a semiconductor pressure sensor. The process of making such a semiconductor pressure sensor comprises the steps of forming a strain gauge resistor by diffusion of impurity ions on the surface layer of a silicon single crystal, assembling four of the strain gauge resistors into a Wheatstone bridge, forming a recess in the back surface of the silicon monocrystal by etching, and disposing electrodes in suitable places on the surface thereof with the thin portion as a disphragm. When pressure is applied to the semiconductor pressure sensor, the diaphragm is deformed and the resistance value of the strain gauge resistor changes to a greater extent because of the piezoelectric resistance effect, so that a bridge output proportional to the pressure is obtainable.

The aforesaid semiconductor pressure sensor is extremely small in size and, particularly in the case of a semiconductor pressure sensor for medical use, a plurality of semiconductor pressure sensors are fitted to the tip of a catheter and inserted into a body. Accordingly, even in a semiconductor pressure sensor incorporating peripheral circuits such as a temperature compensating circuit, a pressure sensitivity compensating circuit and the like, a side of a chip should be about 1 mm or smaller in length.

Variations in the resistance value of each of the strain gauge resistors and diffused resistors at their formation and uniformity in the thickness of the diaphragm produced by the etching process result in variations in the characteristics of the semiconductor pressure sensor.

However, the semiconductor pressure sensor is extremely small in size and it is very difficult to measure the electrical characteristics while pressure is being actually applied and adjust the resistance balance of the bridge circuit. Actually, the measurement of such electrical characteristics while the pressure is being applied is omitted, so that only the electrical characteristics of the bridge circuit are measured to identify and discard what exceed a predetermined tolerance as inferior goods.

Accordingly, yields of the semiconductor pressure sensor are poor and, in addition to this problem, the measurement of electrical characteristics has decreased reliability because the degree of deformation of the diaphragm resulting from the pressure actually applied thereto is not measured.

SUMMARY OF THE INVENTION

In view of the aforesaid problems, an object of the present invention is to provide a method of adjusting a bridge circuit of a semiconductor pressure sensor to improve yields by adjusting the output balance of the bridge circuit based on the output of the semiconductor pressure sensor in a state closely approximated to that of the semiconductor pressure sensor in actual use.

In order to accomplish the aforesaid object, the method of adjusting the bridge circuit of a semiconductor pressure sensor comprises the steps of forming the principal part of the bridge circuit consisting of strain gauge resistors and diffused resistors connecting the strain gauge resistors during the diffusion process of a diaphragm type semiconductor pressure sensor, providing conductive lines connected to at least one of the diffused resistors at predetermined intervals during the wiring process, providing an Al pad common to the ends of the conductive lines, applying vacuum suction to the back surface of the diaphragm in the testing process to create a state wherein pressure is virtually applied to the diaphragm from the surface side thereof, measuring the pressure sensitivity of the semiconductor pressure sensor from the surface side of the diaphragm by making use of the bridge circuit, and selectively cutting the conductive lines based on the pressure sensitivity thus measured to adjust the output balance of the bridge circuit by adjusting the resistance value of the diffused resistor.

In the alternative during the wiring process, pads may be installed at the ends of respective conductive lines and one of the pads may be selected and bonded based on the pressure sensitivity of the semiconductor pressure sensor to adjust the output balance of the bridge circuit.

In the method of adjusting the bridge circuit of a semiconductor pressure sensor, the diaphragm is subjected to vacuum suction from its back surface side to subject the diaphragm to negative pressure during the testing process and the resistance value of the strain gauge resistor forming the principal part of the bridge circuit formed on the diaphragm is caused to change through the deformation of the diaphragm and the piezoelectric resistance effect. The changes in the output of the bridge circuit can be measured by making use of the electrodes formed on the surface of the semiconductor pressure sensor.

The resistance value can be set stepwise by providing the lines connected to the diffused resistor at predetermined intervals and the diffused resistor can be distributed by selectively cutting the lines or bonding one pad whereby the resistance value can simply be adjusted.

Accordingly, before the wafer is diced, it is possible to adjust the bridge circuit of the semiconductor pressure sensor readily by adjusting the resistance balance of the bridge circuit while pressure is being applied thereto.

DETAILED DESCRIPTION OF THE PREFERRED EMBODIMENTS

Referring now to the accompanying drawings, embodiments of the present invention will be described in detail.

Figure 1:
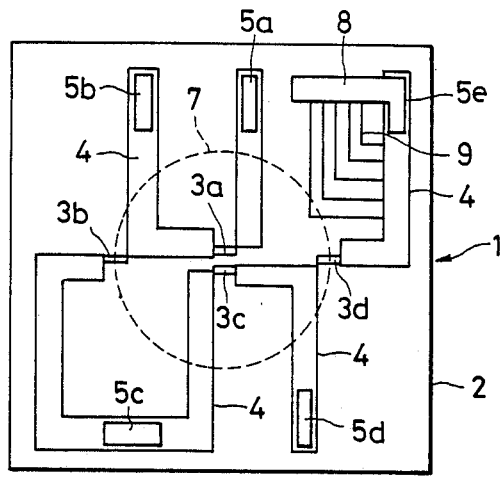
FIG. 1 is a schematic top view showing a method of adjusting a bridge circuit of a semiconductor pressure sensor according to a first embodiment of the present invention.
Figure 2:
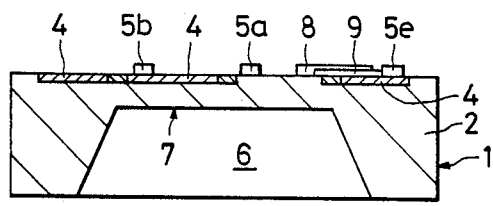
FIG. 2 is a cross sectional view of the semiconductor pressure sensor of FIG. 1.

FIG. 1 is a schematic top view showing a method of adjusting a bridge circuit of a semiconductor pressure sensor according to a first embodiment of the present invention. FIG. 2 is a schematic cross sectional view of the semiconductor pressure sensor. In FIGS. 1 and 2, a semiconductor pressure sensor 1 is extremely small with a thickness of about 400 μm and p$^-$ type strain gauge resistors 3a, 3b, 3c, 3d of several kΩ are formed on the surface of a substrate 2 composed of an n$^-$ type silicon single crystal. Four of the strain gauge resistors are wired in series using p$^+$ diffused resistors 4 which are extended around the surface of the substrate 2 and Al pads 5a, 5b, 5c, 5d, 5e are formed on the diffused resistors 4 thus extended. Moreover, a recess 6 is formed in the back surface of the silicon single crystal 2 with a thin portion (with a thickness of less than 30 μm) used as a diaphragm 7.

In addition to the construction of the aforesaid known semiconductor pressure sensor 1, an Al pad 8 is installed and lines 9 of an electric conductor (for example, aluminum, gold, silver, copper, etc.) are provided to be connected to the diffused resistor 4 wired between the Al pad 5e and the strain gauge resistor 3d at predetermined intervals. The ends of the all lines 9 are connected to the Al pad 8.

Figure 5:
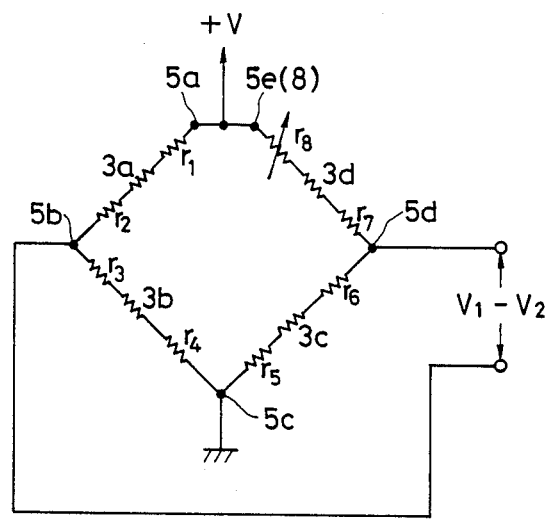
FIG. 5 is an electric circuit diagram showing an electrical arrangement of the semiconductor pressure sensor of FIG. 1.

The Al pads 8 and 5e are connected and further the Al pads 5e and 5a are connected. Voltage is applied across the Al pads 8 (5e) and Al pad 5c to obtain an output between the Al pads 5b and 5d. That is, a bridge circuit is arranged (see FIG. 5). In FIG. 5, $r_1 \sim r_8$ represent the resistance values of the diffused resistors 4. The adjustment of the output balance of the bridge circuit is made by selectively cutting the lines 9 by a laser beam and adjusting the resistance value ($r_8$) between the Al pad 5e and the resistor 3d.

The intervals at which the lines 9 are connected to the diffused resistor 4 are set according to the resistance characteristic (Ω· m) of the resistor and, provided the resistance characteristic is linear, an equal interval is preferred.

The present invention is not limited to the aforesaid embodiments. The Al pads 5a and 5e for example, may be connected, for instance, and voltage is applied across the Al pads 8 and 5d, whereas the resistance value of not only the diffused resistor 4 between the Al pad 5e and the strain gauge resistor 3d but also those of other diffused resistors may be made adjustable, provided the combination and arrangement of parts are modified without departing from the spirit and the scope of the invention as hereinafter claimed.

Figure 6:
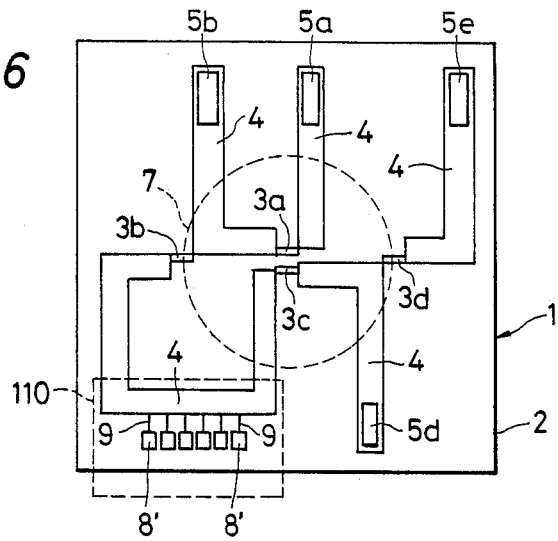
FIG. 6 is a schematic top view showing a method of adjusting a bridge circuit of a semiconductor pressure sensor according to a second embodiment of the present invention.
Figure 7:
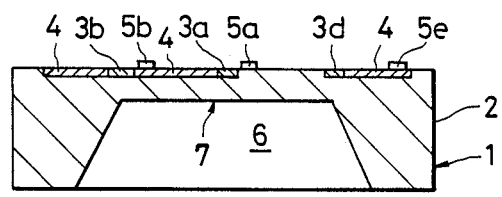
FIG. 7 is a cross sectional view of the semiconductor pressure sensor of FIG. 6.

FIG. 6 is a schematic top view showing a method of adjusting a bridge circuit of a semiconductor pressure sensor according to a second embodiment of the present invention. FIG. 7 is a schematic cross sectional view of the semiconductor pressure sensor of FIG. 6. This embodiment is substantially the same as what is shown in FIG. 1 except that Al pads 8' are connected to the respective conductive lines 9.

Figure 8:
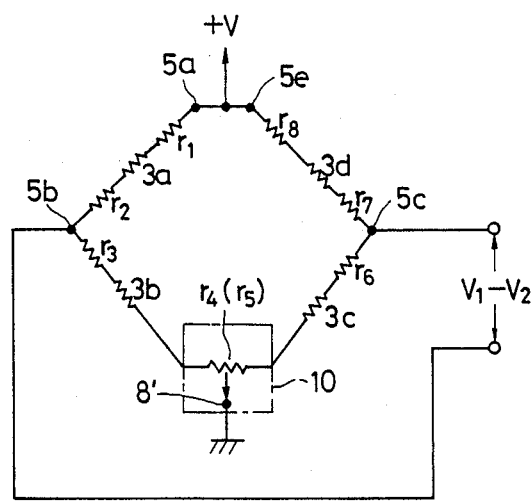
FIG. 8 is an electric circuit diagram showing an electrical arrangement of the semiconductor pressure sensor of FIG. 6.

In this embodiment, the Al pads 5a and 5e are connected and voltage is applied across the Al pads 5a, 5e and the Al pad 8', whereas an output is taken from between the Al pads 5b and 5d. That is, a bridge circuit is thus arranged and any one of the Al pads 8' is properly selected and bonded for the purpose of adjusting the resistance value $r_4$ ($r_5$) of the diffused resistor 4 formed between the strain gauge resistors 3c and 3b as the wiring (see FIG. 8). In FIG. 8, $r_1 \sim r_8$ represent the resistance values of the diffused resistors 4.

A resistance adjusting circuit 110 in this embodiment may be arranged between not only the strain gauge resistors 3b and 3c but also other strain gauge resistors to effect the adjustment of the diffused resistors 4. Moreover, the intervals at which the lines 9 are connected to the diffused resistor 4 are set according to the resistance characteristic (Ω· m) of the resistor and, provided the resistance characteristic is linear, an equal interval is preferred.

Figure 3:
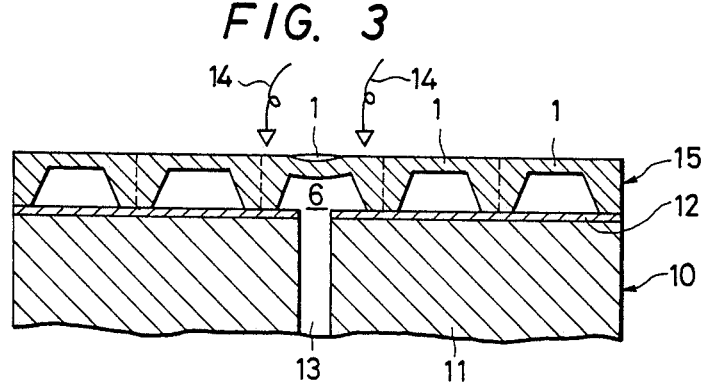
FIG. 3 is a schematic sectional view showing an embodiment for measuring the pressure sensitivity of the semiconductor pressure sensor.

FIG. 3 is a schematic sectional view showing an example for measuring the pressure sensitivity of the semiconductor pressure sensor, wherein a wafer stage 10 has a vacuum leakage preventing seal material 12 of soft synthetic resin (for example, styrene, butadiene or silicone rubber) with a thickness in the order of 10 μm, which is formed on a plate material 11 of stainless or synthetic resin. Further, at least one through-hole 13 is bored in a suitable place of the wafer stage 10 to apply vacuum suction to a recess 6 of the semiconductor pressure sensor 1. The recess 6 of the semiconductor pressure sensor 1 is located above the through-hole 13. In the first embodiment shown in FIG. 1, the measuring probes 14 are caused to contact across the Al pads 5a, 5e and the Al pad 5c (between the input terminals of the bridge) and across the Al pads 5b and 5d (between the output terminals thereof) provided on the surface of the semiconductor pressure sensor 1. In the second embodiment shown in FIG. 6, the measuring probes 14 contact across the Al pads 5a, 5e and the Al pad 8' (between the input terminals of the bridge) and across the Al pads 5b and 5d (between the output terminals thereof).

In order to locate the recess 6 of the semiconductor pressure sensor 1 above the through-hole 13 of the wafer stage 10, the wafer 15 should be moved while the wafer stage 10 and the measuring probes 14 are still or the wafer stage 10 and the measuring probes 14 should be shifted while the wafer 15 is still.

As set forth above, the wafer 15 is mounted on the wafer stage 10 and is subjected to vacuum suction using the through-hole 13 and the seal material on the wafer stage 10 prevents vacuum leakage through the connection between the silicon crystal 2 and the wafer stage 10. Moreover, the negative pressure corresponding to the pressure applied from the surface of the semiconductor pressure sensor 1 is generated at the recess 6 and the diaphragm 7 is deformed as in the case where the pressure is applied thereto from the surface.

Figure 4:
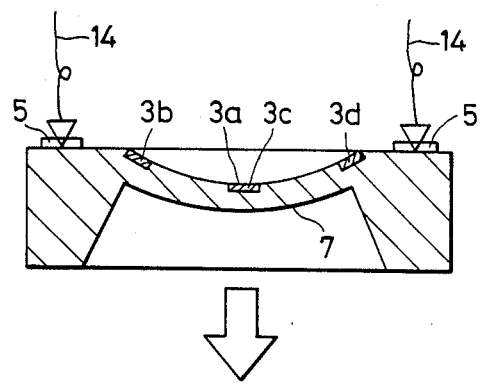
FIG. 4 is a diagram showing a state wherein pressure is applied to the semiconductor pressure sensor.

FIG. 4 is a schematic view showing the diaphragm 7 thus deformed. The strain gauge resistors 3a and 3c formed by diffusion in the center of the diaphragm 7 out of the four strain gauge resistors 3a, 3b, 3c and 3d constituting the bridge circuit as shown in FIGS. 5 or 8, are compressed, whereas the strain gauge resistors 3b and $3d$ diffused on the periphery of the diaphragm 7 are extended as the diaphragm 7 is deformed.

With respect to the strain gauge resistors, use is made of those whose resistance value increases proportionally to the stress. Given the resistance values of the strain gauge resistors $3a$, $3b$, $3c$ and $3d$ respectively at R1, R2, R3 and R4, R2 and R4 increases whereas R1 and R3 decreases as the diaphragm 7 deforms. In other words, the potential $V_1$ across the terminals of the resistor $3b$ increases, whereas the potential $V_2$ across the terminals of the resistor $3c$ decreases.

Accordingly, the bridge output, i.e., $V_1-V_2$ increases in proportion to the deformation of the diaphragm 7.

The pressure sensitivity of the semiconductor pressure sensor 1 can be measured, before the wafer 15 is diced, by measuring the bridge output with the measuring probe 14 using the Al pads of the semiconductor pressure sensor 1.

The output of the semiconductor pressure sensor 1 is measured while the pressure is being applied thereto. With respect to the semiconductor pressure sensor 1 whose measured value shows a slight error, the lines connected to the diffused resistor 4 are appropriately cut out by a laser beam (first embodiment), or one of the Al pads 8' provided at respective lines 9 connected to the diffused resistor 4 at the predetermined intervals is selected (second embodiment), whereby the resistance value of the diffused resistor 4 can be easily adjusted. Therefore, the output balance of the bridge circuit of the semiconductor pressure sensor can be adjusted before the semiconductor pressure sensor is diced.

In a brief summary, the electrical measurement is made from the surface side of the semiconductor pressure sensor 1 and the pressure is applied from the back surface side thereof, whereby the pressure sensitivity of the semiconductor pressure sensor 1 is measured under with the testing process. With respect to the semiconductor pressure sensor 1 showing error in the measurement, the output balance of its bridge circuit can be adjusted by adjusting the resistance value of the diffused resistor 4.

As set forth above, in the method of adjusting the bridge circuit of the semiconductor pressure sensor according to the present invention, there is created a state in which pressure is applied to the diaphragm from the back surface side of the semiconductor pressure sensor and the electrical output is measured in a state similar to that of actual use. Then the lines connected to the diffused resistor at the predetermined intervals are suitably cut out or otherwise one of the Al pads provided at the respective lines connected to the diffused resistor at the predetermined intervals is properly selected and bonded so that the balance adjustment of the bridge circuit of the semiconductor pressure sensor can be made by adjusting the resistance value of the diffused resistor. Accordingly, yields of the semiconductor pressure sensor are improved.

Although, in the above described embodiments, recesses 6 provided in the wafer 15 are subjected to vacuum suction one by one, all recesses may be subjected to vacuum suction simultaneously by providing a porous member, through which a gas can pass, between the wafer 15 and the wafer stage 10 provided the throughhole 13.

Also, in the above described embodiments, although one resistance value of a diffused resistor is adjusted, any resistance values of any diffused resistors may be adjusted.

What is claimed is:

1. A method of adjusting a bridge circuit of a semiconductor pressure sensor, comprising the steps of:
    providing conductive lines connected to at least one of a plurality of diffused resistors at predetermined intervals during wiring, said diffused resistors being provided to connect strain gauge resistors constituting said bridge circuit;
    providing means for adjusting the resistance value of at least said one of said diffused resistors;
    applying vacuum suction to a back surface of a diaphragm of said semiconductor pressure sensor to create a state equivalent to one where pressure is applied to said diaphragm from a front surface side thereof;
    measuring the pressure sensitivity of said semiconductor pressure sensor from the front surface side of the diaphragm by making the use of said bridge circuit; and
    adjusting the resistance value of said at least said one of said diffused resistors by said adjusting means based on the pressure sensitivity thus measured to adjust the balance of said bridge circuit.

2. A method of adjusting a bridge circuit of a semiconductor pressure sensor as claimed in claim 1, wherein said means for adjusting the resistance value consists of said lines and a conductive pad commonly connected to the ends of respective lines and wherein the resistance value of said at least one diffused resistor is adjusted by selectively cutting out said lines based on said pressure sensitivity.

3. A method of adjusting a bridge circuit of a semiconductor pressure sensor as claimed in claim 1, wherein said means for adjusting the resistance value consists of said lines and conductive pads connected to respective ends of said lines and wherein the resistance value of said at least one diffused resistor is adjusted by selecting and bonding one of said pads based on said pressure sensitivity.

* * * * *